T. E. NEWTON.
DUMPING WAGON ATTACHMENT FOR AUTOMOBILES.
APPLICATION FILED APR. 6, 1918.
1,341,381.
Patented May 25, 1920.
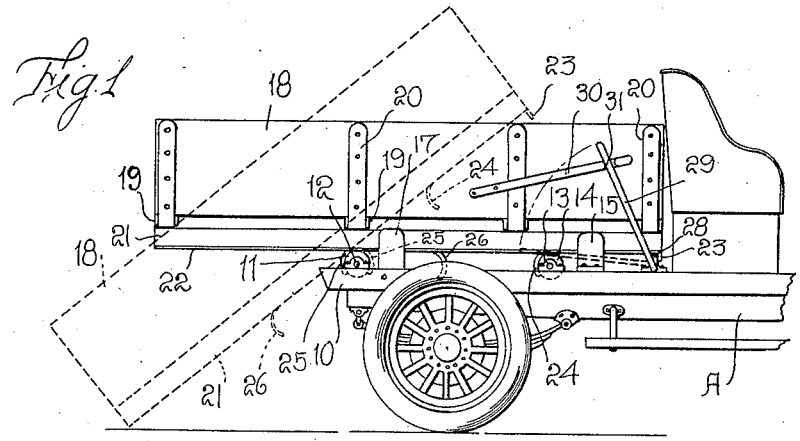
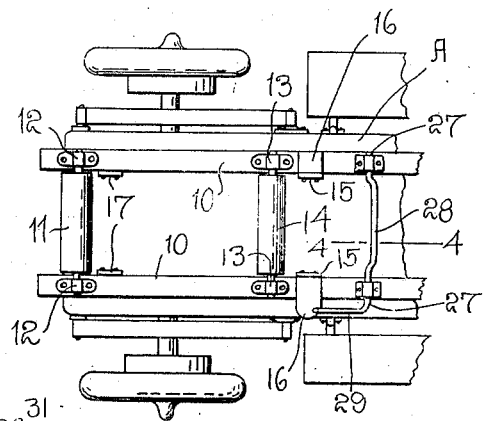
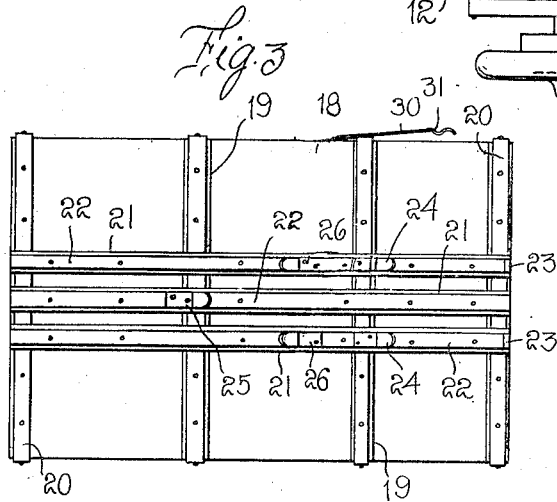
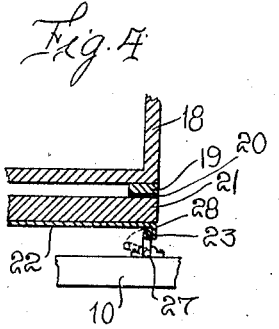
Inventor
Thomas E. Newton
By Watson E. Coleman
Attorney

UNITED STATES PATENT OFFICE.

THOMAS EDWARD NEWTON, OF ZELLWOOD, FLORIDA.

DUMPING-WAGON ATTACHMENT FOR AUTOMOBILES.

1,341,381.     Specification of Letters Patent.     Patented May 25, 1920.

Application filed April 6, 1918. Serial No. 227,066.

*To all whom it may concern:*

Be it known that I, THOMAS E. NEWTON, a citizen of the United States, residing at Zellwood, in the county of Orange and State of Florida, have invented certain new and useful Improvements in Dumping-Wagon Attachments for Automobiles, of which the following is a specification, reference being had to the accompanying drawings.

This invention relates to dumping wagons, and particularly to means whereby an ordinary automobile truck may be provided with a dumping wagon body of a very simple construction.

The general object of my invention is to provide a dumping wagon body of the character above described, which may be very cheaply and strongly constructed and which is thoroughly effective for the purpose intended, the wagon body being mounted upon sills for sliding movement into or out of dumping position.

A further object is to provide improved and very simple means for holding the wagon body against accidental rearward movement.

Other objects will appear in the course of the following description.

My invention is illustrated in the accompanying drawings, wherein:—

Figure 1 is a side elevation of a dumping wagon constructed in accordance with my invention, showing in dotted lines the dumping position of the body;

Fig. 2 is a top plan of the supporting truck;

Fig. 3 is an under side plan view of the body; and

Fig. 4 is a fragmentary transverse vertical section through the forward end of the body and the locking shaft.

The bed of my improved dumping wagon comprises two longitudinally extending sills or beams 10, which are preferably made of 4 by 4 timbers, these timbers being bolted upon the frame of the truck A in any suitable manner. Disposed between these sills 10 adjacent the rear ends of the sills is a roller 11 mounted upon trunnions carried in bearings 12. About the middle of the sills there are provided the bearings 13 carrying the trunnions of a roller 14. Bolted upon the upper faces of the sills 10 forward of the roller 14 are the angular irons 15 providing upwardly extending webs forming guides for the body of the wagon and laterally extending webs 16 one of which extends out beyond the side face of the sills 10. Attached to the sills 10, forward of the roller 11, are the upwardly extending irons 17 also forming guides for the wagon body. These do not project out laterally, however. The wagon body 18 is formed in any suitable manner and the bottom is braced by transverse braces 19. Metallic strips 20 are bolted or otherwise attached to the sides of the wagon box and extend down beneath and across the under face of the several braces 19.

Bolted to the braces 19 are three longitudinally extending beams 21, one of these beams being disposed at the middle of the wagon body and the other two on each side in spaced relation thereto. These beams are preferably 4 by 4, and extend the full length of the wagon body. The under faces of these beams have attached thereto the longitudinally extending metallic strips 22, the forward ends of these strips being downwardly turned or bent as at 23 to form hooks with which the latching device on the supporting frame is adapted to engage as will be later described. The under faces of the metallic strips 22 are provided with the downwardly and forwardly extending hook-shaped members 24 and 25 which are so spaced that when the wagon body is in the forward position on the supporting frame, these hooks 24 and 25 will engage respectively with the rollers 14 and 11. The lateral beams 21 are provided with downwardly and rearwardly extending hook-shaped members 26 disposed forward of the center of gravity of the body so that when the body is shifted to its rearmost position, that is, into dumping position, these hooks will engage with the roller 11.

It will be understood that the beams 21 are so distant from each other that they all bear upon the rollers 11 and 14 and operate between the guides 17 and 15.

For the purpose of latching the body in its horizontal position, and preventing rearward movement of the body upon the supporting frame, I mount upon the beams 10 the transevrsely extending shaft 27, the middle portion of which is cranked as at 28 to coact with the hooks 23. When this cranked portion 28 is turned upward it will engage the hooks 23 and when it is turned downward, it will release these hooks. Mounted upon the end of the shaft 27 is an upwardly extending lever 29 by which the shaft 27 may be turned, and mounted upon the side of the wagon body is a spring detent 30 comprising a strip of spring metal attached to the side of the wagon body, the forward portion of this strip being outwardly disposed from the wagon body and being formed with a detent recess 31 in which the lever is received and by which it is held from movement to a box releasing position. This spring detent holds the lever from accidental movement but on force being applied to the lever to turn it, the spring detent will be forced inward and thus the crank shaft will release its engagement with the hooks 23 and permit the body to be shifted rearward until it overbalances and turns to a dumping position.

It will be seen that the hooks 24 and 25 provide means for holding the body firmly upon its supporting frame against any forward movement of the body independent of the frame, while the hooks 23 and the latch shaft 27 prevent any rearward movement of the body. It will be seen that the base frame consisting of the beams 10 and the rollers 11 may be readily removed at any time from the truck frame to which it is attached so that the truck may be used for other purposes or as readily put in place and it will also be obvious that the body may be readily removed from the supporting frame comprising the members 10 and 11.

Inasmuch as the beams 21 are all faced with metallic strips, it is obvious that there will be no wear on these beams, the metallic strips coming in contact with the rollers 11 and 14. These rollers may be made of any suitable material. It will further be seen that the body of the wagon is held against lateral movement by the guide members 15 and 17.

Having described my invention, what I claim is:

In a dumping wagon, a base supporting frame, a body slidingly supported on said frame for longitudinal movement, and means for latching the body in its forward position upon the supporting frame comprising downwardly extending hooks on the forward end of the body, a transverse shaft mounted on the supporting frame and having a cranked portion adapted in one position to engage with said hooks, a lever on one end of the shaft whereby the shaft may be rotated to its operative or inoperative position, and a resilient latch mounted on the body and engaging with said lever to hold it in its operative position.

In testimony whereof I hereunto affix my signature in the presence of two witnesses.

THOMAS EDWARD NEWTON.

Witnesses:
 JOE L. KING,
 ARTHUR R. KING.